United States Patent
Froude et al.

(10) Patent No.: US 6,260,876 B1
(45) Date of Patent: Jul. 17, 2001

(54) THERMOPLASTIC AIR BAG COVER MOUNTABLE ONTO AN AIR BAG CONTAINER ASSEMBLY

(75) Inventors: Michael G. Froude, Fraser; Jason T. Murar, Clinton Township, both of MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/489,434

(22) Filed: Jan. 21, 2000

(51) Int. Cl.[7] ..................................................... B60R 21/16
(52) U.S. Cl. ................... 280/728.3; 280/731; 200/61.54; 200/61.55
(58) Field of Search ................................. 280/728.3, 731, 280/728.2; 200/61.54, 61.55

(56) References Cited

U.S. PATENT DOCUMENTS

| | | |
|---|---|---|
| 5,062,661 | 11/1991 | Winget . |
| 5,465,998 | 11/1995 | Davis . |
| 5,498,026 | 3/1996 | Eckhout . |
| 5,501,485 | 3/1996 | Eckhout . |
| 5,520,412 | 5/1996 | Davis . |
| 5,590,902 | 1/1997 | Eckhout . |
| 5,642,901 | 7/1997 | Bowman et al. . |
| 5,683,101 | 11/1997 | Davis et al. . |
| 5,685,561 | 11/1997 | Kauer . |
| 5,720,493 | 2/1998 | Sugiyama et al. . |
| 5,725,241 | 3/1998 | Schenck . |
| 5,762,635 | 6/1998 | Worrell et al. . |
| 5,794,968 | 8/1998 | Yamamoto et al. . |
| 5,853,190 | 12/1998 | Rion et al. . |
| 5,873,596 | 2/1999 | Kantoh et al. . |
| 5,899,487 | 5/1999 | Fischer . |
| 5,979,933 | 11/1999 | Murar et al. . |

Primary Examiner—Eric Culbreth
(74) Attorney, Agent, or Firm—Brooks & Kushman P.C.

(57) ABSTRACT

A snap-on thermoplastic air bag cover mountable onto an air bag container assembly includes a novel mechanism for attaching a horn backing plate to the cover. The assembly includes a container having a retaining member and a retaining bracket. The cover includes a front panel having inner and outer surfaces and is adapted to overlie an uninflated air bag contained within the container. The cover also includes a plurality of side walls connected to and extending rearwardly from the inner surface of the front panel, a horn switch lying behind the inner surface of the front panel, and a plurality of locking blocks having an extending snap-on groove and which are connected to their respective side walls. Two of the locking blocks have a groove defined in rearwardly facing surfaces thereof. The cover also includes a backing section with a back plate cooperating with the front panel to form a hollow compartment for the switch. The switch is activated by depression of the front panel at its outer surface. The backing section also includes a first member attached to and extending rearwardly from the back plate and a second member attached to and extending outwardly from the first member and having a second groove aligned with the first groove of one of the locking blocks. The block and the second member are adapted to receive and retain the retaining bracket within the aligned grooves for securing the back plate to the air bag cover.

6 Claims, 2 Drawing Sheets

THERMOPLASTIC AIR BAG COVER MOUNTABLE ONTO AN AIR BAG CONTAINER ASSEMBLY

CROSS-REFERENCE TO RELATED APPLICATION

This application is related to U.S. patent application entitled "Snap-On Thermoplastic Air Bag Cover With Enhanced Moldability," having Ser. No. 09/489,535, filed on the same date as this application and having the same assignee as this application.

TECHNICAL FIELD

This invention relates to thermoplastic air bag covers mountable onto air bag container assemblies wherein a switch, such as a horn blow switch, is also provided with the cover.

BACKGROUND ART

A wide variety of methods are currently employed to attach a switch backing plate to a driver air bag cover. For example, mechanical fasteners, heat-staking or emabonding are frequency used.

U.S. Pat. No. 5,794,968 discloses an air bag device including a cover having front and rear side walls that include securing grooves which engage projections.

U.S. Pat. No. 5,899,487 discloses an apparatus for attaching a cover on a part of a vehicle including an attachment rib and an interlocking snap connection.

U.S. Pat. No. 5,873,596 discloses an air bag device having a horn switch and support plate between the air bag and a pad whereby the support plate is attached to the bag holder by an attaching leg.

U.S. Pat. No. 5,853,190 discloses a fastenerless air bag cover and air bag module having at least one engagement member for engaging a housing connector;

U.S. Pat. No. 5,762,365 discloses an air bag cover assembly having a plurality of mounting posts extending downwardly from the cover to a reaction plate captured between the cover and a gasket.

U.S. Pat. No. 5,725,241 discloses an air bag cover assembly having a substrate layer, an outer layer and a backing plate mounted to the substrate layer and overlying a switch aperture.

U.S. Pat. No. 5,720,493 discloses a restraint system having a generally L-shaped switch support section.

U.S. Pat. No. 5,979,933 discloses an air bag cover assembly including a switch fastenable to an air bag housing assembly.

Other related patents include U.S. Pat. Nos. 5,062,661; 5,465,998; 5,642,901; 5,590,902; 5,520,412; 5,685,561; 5,498,026; 5,501,485; and 5,683,101.

However, some if not all of the above-noted prior art still require secondary attachment equipment and processes to attach a switch backing plate to its air bag cover.

DISCLOSURE OF INVENTION

An object of the present invention is to provide a thermoplastic air bag cover mountable onto an air bag container assembly wherein the necessity for secondary attachment equipment and processes to attach a backing plate to the cover is substantially reduced or eliminated.

Another object of the present invention is to provide a thermoplastic air bag cover mountable onto an air bag container assembly wherein a switch backing plate is attached to the cover without the use of special mechanical fasteners, heat-staking or emabonding.

In carrying out the above objects and other objects of the present invention, a thermoplastic air bag cover mountable onto an air bag container assembly is provided. The assembly includes a container having a retaining member and a retaining bracket. The cover includes a front panel having inner and outer surfaces and adapted to overlie an uninflated air bag contained within the container. The cover also includes a plurality of side walls connected to and extending rearwardly from the inner surface of the front panel, a switch lying behind the inner surface of the front panel, and a block connected to at least one of the side walls. The block has a first groove defined in a rearwardly facing surface of the block. The cover further includes a backing section including a back plate cooperating with the front panel to form a hollow compartment for the switch. The switch is activated by depression of the front panel at its outer surface. The backing section also includes a first member attached to and extending rearwardly from the back plate and a second member attached to and extending outwardly from the first member and having a second groove aligned with the first groove. The block and the second member are adapted to receive and retain the retaining bracket within the aligned grooves for securing the backing plate to the air bag cover.

Preferably, the air bag cover is a snap-on air bag cover and a block is connected to each of the side walls. Each of the blocks is a locking block having an extending snap-on groove defined in a second surface of the locking block. The first member has a third groove aligned with the snap-on groove of one of the locking blocks to permit movement of the retaining member therethrough during movement of the cover on the container to secure the retaining member within the snap-on groove of the one of the locking blocks.

The back plate is preferably positioned at the inner surface of the front panel in containing relationship to the switch. The first member is attached to and extending rearwardly from one end of the back plate.

Preferably, the thermoplastic material is thermoplastic rubber and the switch is a membrane-type horn switch.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
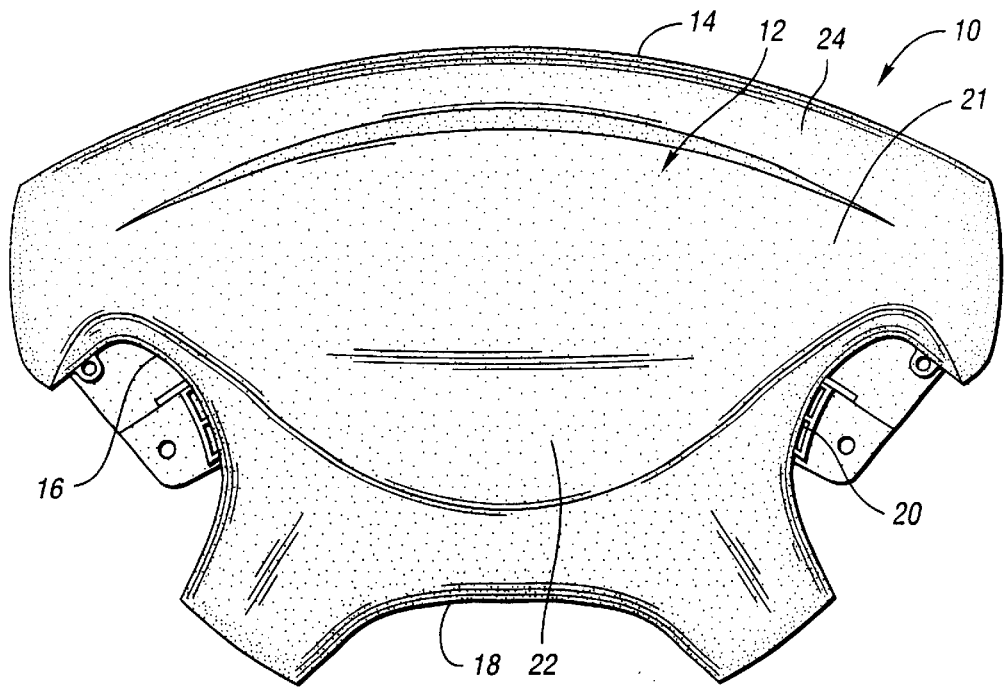
FIG. 1 is a front elevational view of an air bag cover constructed in accordance with the present invention.
Figure 2:
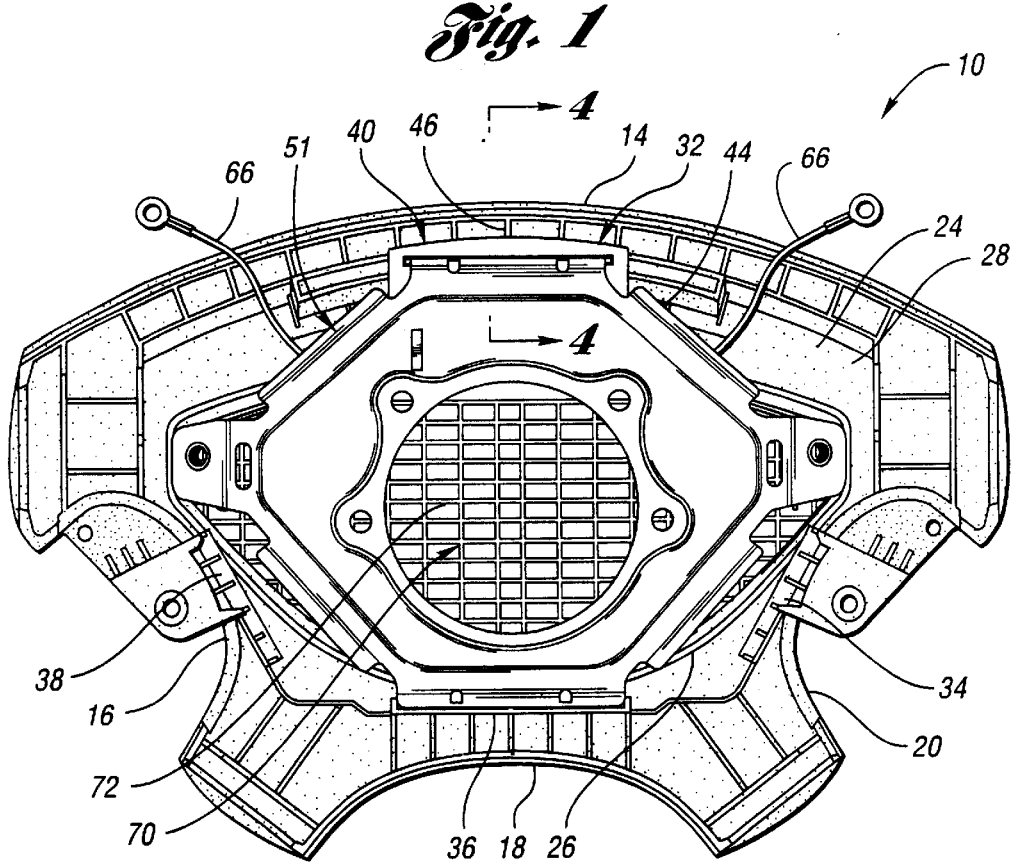
FIG. 2 is a rear elevational view of the air bag cover including a conventional retaining bracket of an air bag container assembly attached thereto.

Referring now to the drawing Figures, there is illustrated in FIGS. 1 and 2 an embodiment of an automotive air bag cover, generally indicated at 10, constructed in accordance with the present invention. Typically, the automotive air bag cover 10 is secured at the top end of a vehicle drive column (not shown) at the steering wheel of the vehicle.

A front panel, generally indicated at 12, of the air bag cover 10, is integrally formed with side panels 14, 16, 18 and 20. An outer surface 21 of the front panel 12 is disposed to face a vehicle operator (not shown).

The front and side panels 12, 14, 16, 18 and 20 are adapted to enclose an uninflated automotive air bag (not shown) between the cover 10 and the steering column (not shown).

The front panel 12 includes upper and lower portions 24 and 22, respectively. The upper and lower portions 24 and 22 are interconnected to the side panels 14–20 and to each other at a break seam 26 shown in FIGS. 2 and 3. The break seam 26 is of reduced thickness to permit the air bag, as it is inflating, to exert a force at the lower portion 22 of the front panel 12 at an inner surface 28 of the front panel 12 to cause the lower portion 22 of the front panel 12 to separate from the side panels 14–20 and the upper portion 24 along the break seam 26.

Figure 3:
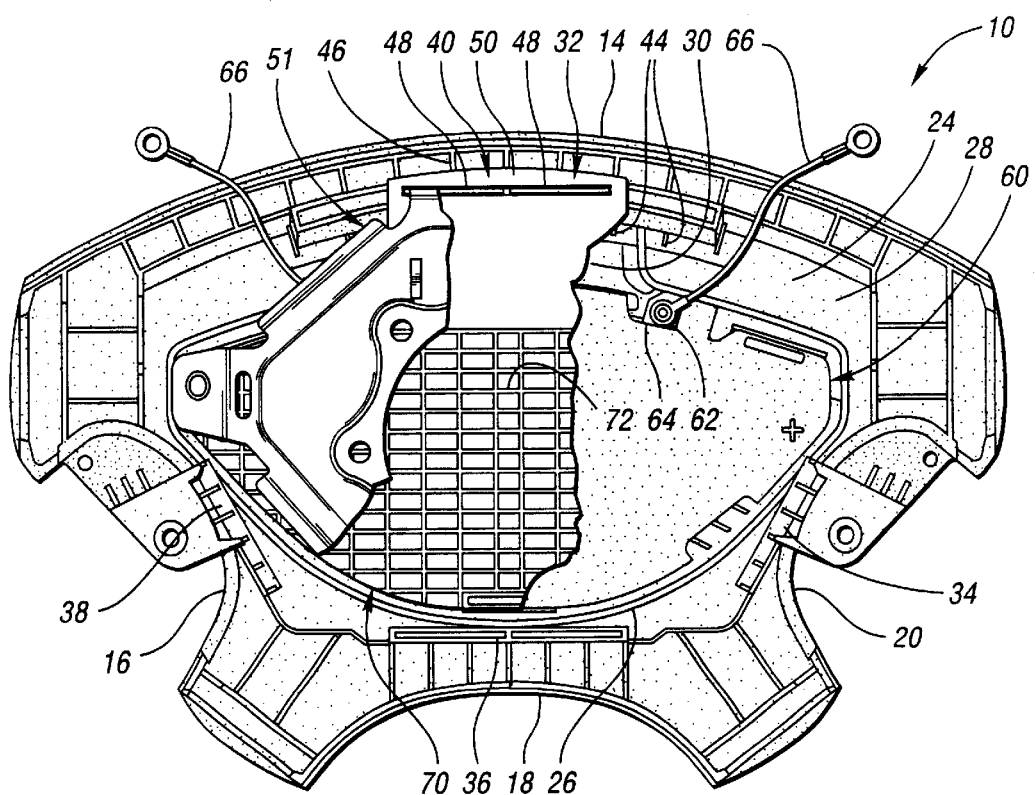
FIG. 3 is a rear elevational view, partially broken away, of the air bag cover and illustrating a membrane-type horn switch and a backing section of the cover.

The lower portion 22 of the front panel 12 is hingedly connected to the top portion 24 at a hinge 30, as best shown in FIG. 3. After separation from the side panels 16–20, the lower portion 22 of the front panel 12 can swing upwardly and out of the way of the inflating air bag.

Referring again to FIGS. 2 and 3, there are shown four locations 32, 34, 36 and 38 at which an air bag container (not shown) having a retaining member is affixed with the air bag cover 10. Since the structures for mounting the cover 10 on the container at each of locations 32, 34, 36 and 38 are substantially identical in cross-section, only the structure at location 32 is now described with reference to FIG. 4.

Figure 4:
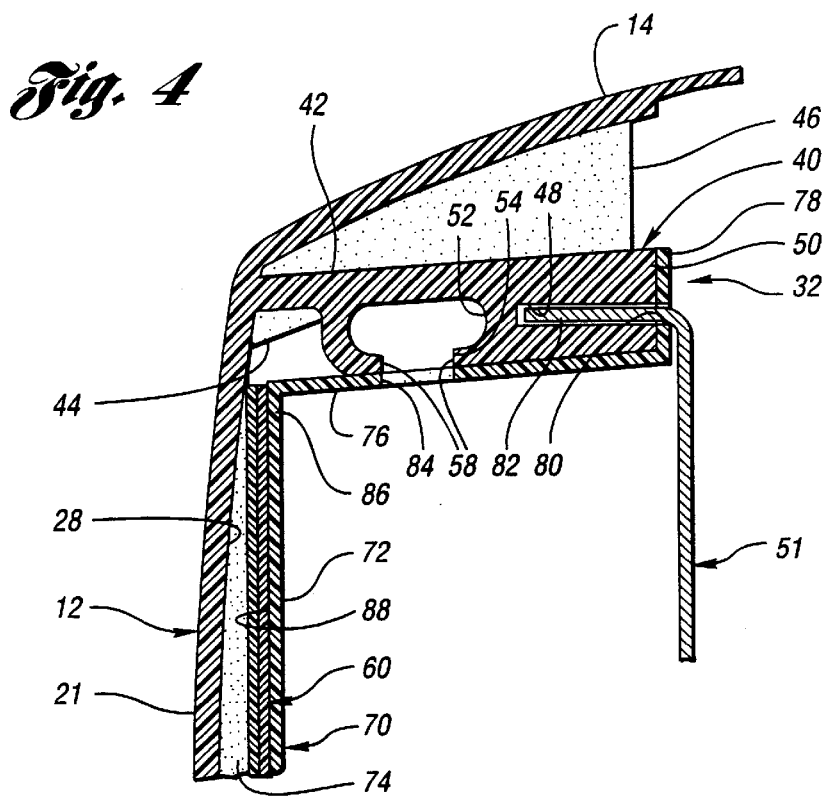
FIG. 4 is a view, partially broken away and in cross-section, of the air bag cover taken along lines 4—4 of FIG. 2.

Referring now to FIG. 4, there is shown a resilient side locking block, generally indicated at 40. The locking block 40 is connected to and extends inwardly from a side wall 42. The side wall 42, in turn, is connected to and extends rearwardly from the inner surface 28 of the front panel 12. The side wall 42 and the locking block 40 are supported within the cover 10 by integrally-formed, triangular-shaped ribs 44 and 46, respectively. The ribs 44 extend between the inner surface 28 of the front panel 12 and the wall 42 and the ribs 46 extend between the side panel 14 and the wall 42.

As best shown in FIG. 4, retaining slots or grooves 48 are formed in a rearwardly facing surface 50 of the locking block 40 for receiving and retaining a conventional metal retaining bracket, generally indicated at 51, of the air bag container assembly. A snap-on groove 52 is shown formed within the locking block 40 at its side surface 54. The snap-on groove 52 is disposed between a pair of beak portions 58 of the locking block 40. The snap-on groove 52 is configured to cooperate with a retaining rim of an air bag container. For proper connection and retainment, the snap-on groove 52 should have a cross-sectional shape that corresponds to the shape of the air bag container rim.

A switch in the form of a membrane-type horn switch, generally indicated at 60, lies behind the inner surface 28 of the front panel 12. The switch 60 includes electrical terminals 62 (only one of which is shown in FIG. 3) formed on a resilient plastic member 64 of the switch 60. In turn, electrical leads or wires 66 are connected to the terminals 62 and are adapted to be electrically connected to the vehicle's electrical system.

A backing section, generally indicated at 70, of the cover 10 includes a back plate 72 which cooperates with the front panel 12 to form a hollow compartment 74 for the switch 60.

The switch 60 is activated by depression of the front panel 12 at its outer surface 21.

The backing section 70 also includes a resilient first member 76 attached to and extending rearwardly from one end of the back plate 72 and a resilient second member 78 attached to and extending outwardly from the first member 76. The first member 76 has a groove 80 aligned with the first or retaining groove 48. The block 40 and the second member 78 are adapted to receive and retain a bent portion 82 of the retaining bracket 51 within the aligned grooves 48 and 80 for securing the back plate 72 to the air bag cover 10.

The first member 76 of the backing section 70 has a groove 84 aligned with the snap-on groove 52 to permit the movement of the retaining member (not shown) of the air bag container therethrough during movement of the cover 10 on the container to secure the retaining member within the snap-on groove 52.

Typically, the back plate 72 is located and positioned on the inner surface 28 of the front panel 12 at one end thereof in containing relationship to the switch 60 by a pair of spaced stakes (not shown) which are integrally formed at and project from the inner surface 28 of the front panel 12 and which extend through spaced holes (not shown) formed in the back plate 72.

The back plate 72 may have a plurality of switch activating members (not shown) which are integrally formed at and project inwardly from an inner surface 88 of the back plate 72. The switch activating members enhance activation of the membrane-type switch 60 by providing pressure points as described in detail in the above-noted U.S. Pat. No. 5,642,901.

It is preferred that the air bag cover 10 of the present invention be manufactured from a flexible thermoplastic rubber such as commercially available "Santoprene® 201-87" provided by Advance Elastomers Systems of Auburn Hills, Mich. Santoprene® is a registered trademark of the Monsanto Company. Santoprene® 201-87 is a colorable thermoplastic general purpose elastomer with good fluid resistance which is processable by injection molding and extrusion.

The tear strength, ultimate tensile strength, hardness, and elasticity of the material are characteristically important to the choice of the thermoplastic material used to manufacture the air bag. The preferred thermoplastic material used for manufacture of the air bag cover has a tensile strength in a range from 15.0 to 17.0 Mpa's. The preferred material used has a tear strength in a range from 47 to 51 kN/M at 25° C. and 21 to 25 kN/M at 100° C. The preferred material used has a durometer hardness in a range of 70 to 100 on the Shore A scale. The above characteristics in conjunction with the structure of the air bag cover 10 satisfy the necessary conditions related to the inflation and exit of the air bag from the cover 10.

The particular thermoplastic rubber described above assists in providing the operative resilient characteristics needed to provide an air bag cover 10 which is directly affixable to an air bag container. The air bag cover 10 of the present invention is resilient enough to accept deformation of the side walls 42 and locking blocks 40 while the air bag cover 10 is connected to the air bag container on the steering column (not shown) throughout the operative life of the associated vehicle. The cover 10 is relatively easy to mold and does not require extensive part fill out. Thus, the tear strength, ultimate tensile strength, hardness, and elasticity of the thermoplastic rubber material, as described above are important to the overall operation of the air bag cover 10.

The air bag cover 10 of the present invention is preferably injection molded using conventional injection molding techniques.

While the best mode for carrying out the invention has been described in detail, those familiar with the art to which this invention relates will recognize various alternative designs and embodiments for practicing the invention as defined by the following claims.

What is claimed is:

1. A thermoplastic air bag cover mountable onto an air bag container assembly including a container having a retaining member and a retaining bracket, the cover comprising:
   a front panel having inner and outer surfaces and adapted to overlie an uninflated air bag contained within the container;
   a plurality of side walls connected to and extending rearwardly from the inner surface of the front panel;
   a switch lying behind the inner surface of the front panel;
   a block connected to at least one of the side walls, the block having a first groove defined in a rearwardly facing surface of the block; and
   a backing section including a back plate cooperating with the front panel to form a hollow compartment for the switch, the switch being activated by depression of the front panel at its outer surface, the backing section also including a first member attached to and extending rearwardly from the back plate and a second member attached to and extending outwardly from the first member and having a second groove aligned with the first groove, the block and the second member being adapted to receive and retain the retaining bracket within the aligned grooves for securing the backing plate to the air bag cover.

2. The cover as claimed in claim 1 wherein the air bag cover is a snap-on air bag cover and wherein a block is connected to each of the side walls and wherein each of the blocks is a locking block having an extending snap-on groove defined in a second surface of the locking block and wherein the first member has a third groove aligned with the snap-on groove of one of the locking blocks to permit movement of the retaining member therethrough during movement of the cover on the container to secure the retaining member within the snap-on groove of the one of the locking blocks.

3. The cover as claimed in claim 1 wherein the back plate is positioned at the inner surface of the front panel in containing relationship to the switch, the first member being attached to and extending rearwardly from one end of the back plate.

4. The cover as claimed in claim 1 wherein the thermoplastic material is a thermoplastic rubber.

5. The cover as claimed in claim 1 wherein the switch is a membrane switch.

6. The cover as claimed in claim 5 wherein the membrane switch is a horn switch.

* * * * *